(12) United States Patent
McCann, III et al.

(10) Patent No.: US 10,518,514 B2
(45) Date of Patent: Dec. 31, 2019

(54) METHOD AND APPARATUS FOR PROVIDING LIQUID-PROOF SEAMS FOR CORRUGATED ELASTIC LAMINATES AND ARTICLES MADE THEREFROM

(71) Applicant: W. L. Gore & Associates, Inc., Newark, DE (US)

(72) Inventors: Francis E. McCann, III, Newark, DE (US); Andrea Biro, Newark, DE (US); Michael V. Edwards, Wilmington, DE (US)

(73) Assignee: W. L. Gore & Associates, Inc., Newark, DE (US)

( * ) Notice: Subject to any disclaimer, the term of this patent is extended or adjusted under 35 U.S.C. 154(b) by 772 days.

(21) Appl. No.: 14/607,356

(22) Filed: Jan. 28, 2015

(65) Prior Publication Data

US 2015/0140254 A1    May 21, 2015

Related U.S. Application Data

(62) Division of application No. 13/408,822, filed on Feb. 29, 2012, now Pat. No. 8,974,616.

(51) Int. Cl.
*A41D 27/24* (2006.01)
*B32B 37/10* (2006.01)
(Continued)

(52) U.S. Cl.
CPC ............ *B32B 37/10* (2013.01); *A41D 27/245* (2013.01); *B32B 3/02* (2013.01); *B32B 3/18* (2013.01); *B32B 3/28* (2013.01); *B32B 5/02* (2013.01); *B32B 5/022* (2013.01); *B32B 5/024* (2013.01); *B32B 5/026* (2013.01); *B32B 7/05* (2019.01); *B32B 7/08* (2013.01); *B32B 7/12* (2013.01); *B32B 27/12* (2013.01); *B32B 27/285* (2013.01); *B32B 27/286* (2013.01); *B32B 27/288* (2013.01); *B32B 27/304* (2013.01); *B32B 27/322* (2013.01); *B32B 27/34* (2013.01);
(Continued)

(58) Field of Classification Search
CPC ....................................................... B32B 37/10
USPC .............................................................. 428/59
See application file for complete search history.

(56) References Cited

U.S. PATENT DOCUMENTS 3,417,543 A    12/1968    Jones, Jr.
3,861,123 A    1/1975    Eburn, Jr. et al.
(Continued)

*Primary Examiner* — Brent T O'Hern
(74) *Attorney, Agent, or Firm* — Greenberg Traurig, LLP

(57) ABSTRACT

A liquid-proof seamed article including an elastic laminated panel and a corrugated elastic laminated panel joined at the sealing regions of the laminated panels is provided. In exemplary embodiments, both of the laminated panels are corrugated. The laminated panels each include a textile layer and a protective layer. At least one of the textile layer and protective layer is elastic. An adhesive pre-treatment may be applied to the elastic laminate panel and/or the corrugated laminate panel along respective sealing regions prior to forming a seam. Additionally, the laminate can be stretched to substantially flatten the corrugations prior to forming a seam. By substantially flattening the surface of the corrugated laminated panel(s), an adhesive may be applied such that there are no gaps in the adhesive. The corrugated laminates may be used as material for making garments. An apparatus and a method for making a liquid-proof seamed article are also provided.

10 Claims, 8 Drawing Sheets

(51) Int. Cl.
*B32B 3/28* (2006.01)
*B32B 38/00* (2006.01)
*B32B 37/12* (2006.01)
*B32B 3/02* (2006.01)
*B32B 5/02* (2006.01)
*B32B 7/12* (2006.01)
*B32B 27/32* (2006.01)
*B32B 7/08* (2019.01)
*B32B 27/12* (2006.01)
*B32B 27/28* (2006.01)
*B32B 27/30* (2006.01)
*B32B 27/34* (2006.01)
*B32B 27/36* (2006.01)
*B32B 27/40* (2006.01)
*B32B 3/18* (2006.01)
*B32B 7/05* (2019.01)

(52) U.S. Cl.
CPC .............. *B32B 27/36* (2013.01); *B32B 27/40* (2013.01); *B32B 37/1284* (2013.01); *B32B 38/0012* (2013.01); *B32B 2038/0028* (2013.01); *B32B 2307/51* (2013.01); *B32B 2307/7265* (2013.01); *B32B 2437/00* (2013.01); *Y10T 156/1044* (2015.01); *Y10T 156/14* (2015.01); *Y10T 428/193* (2015.01)

(56) References Cited

U.S. PATENT DOCUMENTS

| | | | |
|---|---|---|---|
| 4,561,128 A | 12/1985 | Zimmerman | |
| 4,785,479 A * | 11/1988 | Watanabe | A41D 19/0055 2/163 |
| 5,244,716 A * | 9/1993 | Thornton | A41B 11/005 428/198 |
| 5,804,011 A | 9/1998 | Dutta et al. | |
| 6,230,781 B1 | 5/2001 | Smith | |
| 6,716,778 B1 * | 4/2004 | Hottner | A41D 27/245 2/275 |
| 6,863,107 B2 | 3/2005 | Hein et al. | |
| 7,721,349 B1 * | 5/2010 | Strauss | A41D 13/0053 2/102 |
| 2011/0167547 A1 | 7/2011 | Jain | |

* cited by examiner

METHOD AND APPARATUS FOR PROVIDING LIQUID-PROOF SEAMS FOR CORRUGATED ELASTIC LAMINATES AND ARTICLES MADE THEREFROM

FIELD OF THE INVENTION

This invention relates to corrugated elastic laminates having liquid-proof seams and the formation thereof. These seamed laminates are useful in the production of liquid-proof garments or other apparel, especially garments that are both liquid-proof and protective.

BACKGROUND OF THE INVENTION

The use of laminates formed of textiles and protective layers to produce liquid-proof apparel is well-known. For instance, pieces or panels of laminates may be joined together in a conventional manner, such as by sewing, to form garments or other apparel. However, in order for these garments to be liquid-proof, the seams where the panels of laminate are joined together need to be properly sealed.

Liquid-proof sealing of seams is typically accomplished by the application of a seam seal tape having an adhesive that adheres to the surface of the laminate and creates a seal over the sewing holes and the areas where the layers join between the stitches.

In many applications, it is desirable to use a textile layer on both sides of the protective layer, such as, for example, to improve durability or to improve the aesthetics and/or sensorial comfort of the finished garment. The use of such three-layered constructions presents difficulties with respect to achieving a liquid-proof seam. Problems of achieving liquid-proof seams have been especially difficult to overcome in constructions that utilize laminates including a corrugated textile. In a natural, relaxed state, the corrugated textile, and hence the laminate, has a corrugated (or accordion) shape that allows for an applied adhesive to flow between the valleys of the corrugations. When seam sealing with a conventional seam sealing tape, gaps in the applied adhesive of the sealed seam occur, causing the seams to leak. Efforts for seam sealing such corrugated laminates to date have not successfully addressed this problem.

Accordingly, a need continues to exist for a reliable and effective technique for joining two or more corrugated laminates having a flexible and liquid-proof seam.

SUMMARY OF THE INVENTION

It is an object of the present invention to provide a seamed article that includes (1) at least two elastic laminate panels where the laminated panels each include at least one protective layer, at least one textile layer affixed to the at least one protective layer, and a sealing region on at least a portion of each laminate panel, and (2) at least one liquid-proof seam joining the sealing regions of the at least two corrugated laminate panels. At least one of the elastic laminate panels is corrugated. In addition, the protective layer and/or the textile layer may be elastic. In at least one exemplary embodiment, the protective layer is expanded polytetrafluoroethylene.

It is also an object of the present invention to provide a corrugated elastic laminate that includes a corrugated elastic laminate having at least one protective layer and at least one textile layer affixed to the at least one first protective layer. The protective layer and/or the textile layer are elastic.

It is yet another object of the present invention to provide a corrugated elastic laminate article that includes (1) a corrugated elastic laminate having at least one protective layer and at least one textile layer affixed to the at least one protective layer and (2) a seam joining a sealing region of the corrugated elastic laminate with a sealing region of an elastic laminate. At least one of the protective layer and the textile layer is elastic. In exemplary embodiments, the elastic laminate is a corrugated elastic laminate.

It is a further object of the present invention to provide a method of making a liquid-proof seam for a corrugated laminate that includes (1) providing a corrugated elastic laminate having at least one protective layer and at least one textile layer, (2) forming a seam by joining a sealing region of the corrugated elastic laminate with a sealing region of an elastic laminate to form a seamed corrugated laminate, and (3) sealing the seam by sequentially applying and bonding an adhesive adhesive to the seamed corrugated laminate while substantially flattening the corrugations of the laminate at the sealing region. The sealing provides the seamed corrugated laminate with a liquid-proof seam. In at least one exemplary embodiment, embodiment, the elastic laminate is a corrugated elastic laminate. In addition, at least one of the protective layer and the textile layer is elastic. In one or more embodiment, the sealed seam is durably liquid-proof. An optional adhesive pre-treatment may be applied to the corrugated laminate along the sealing region prior to forming the seam. The adhesive pre-treatment may be carried out by any conventionally known technique for applying an adhesive. Additionally, the laminate can be stretched to substantially flatten the corrugations prior to forming the seam.

It is a further object of the present invention to provide a seam sealing apparatus that includes (1) a first drive unit with at least one convex surface and a second drive unit with at least one mating concave surface arranged to form a nip therebetween for passing a seamed corrugated laminate through the nip and applying an adhesive to the seamed laminate while substantially flattening the corrugations along the at least one seam and (2) means for sealing the seam by bonding the adhesive to the seamed corrugated laminate. The seam sealing means provides a liquid-proof seam for the seamed corrugated laminate. The seamed corrugated laminate includes at least one protective layer and at least one textile layer. The protective layer and/or the textile layer may be elastic. The protective layer may be expanded polytetrafluoroethylene. In exemplary embodiments, the seam is durably liquid-proof.

By way of the invention, seams for corrugated laminates are provided, which seams are liquid-proof, especially durably liquid-proof, as well as resistant to penetration by chemical and biological agents, for use in the manufacture of protective garments.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DEFINITIONS

Figure 1:
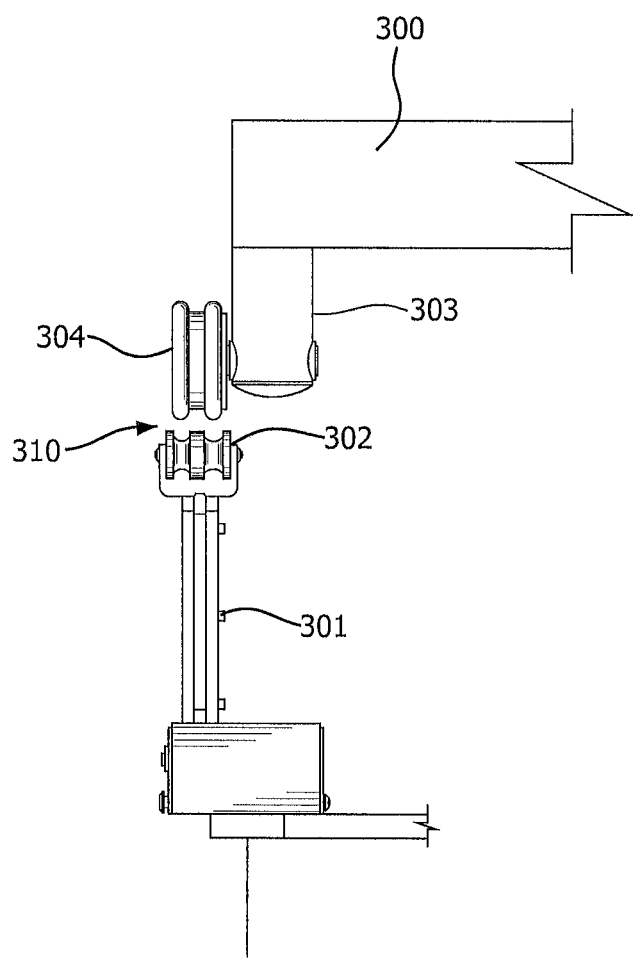
FIG. 1 is a schematic illustration of a seam sealing apparatus having a lower drive unit with a solid concave roller and an upper drive unit with a solid convex roller according to one exemplary embodiment of the invention.

As used herein, "laminate" means an article comprising multiple layers, such as a protective film or coating that is coated onto or adhered to at least one layer of textile, resulting in a composite. Optionally, the laminate and the multiple layers may be flexible.

As used herein, the term "elastic" means having an elongation greater than about 100% at 4 lbf for five seconds with a recovery of at least about 95%.

By definition, an elastic laminate has at least one elastic layer. Accordingly, a demonstration of an elastic layer within the laminate is sufficient to test for the elasticity of the laminate. In other words, if the laminate is elastic, at least one layer within the laminate is elastic.

The term "inelastic", as used herein, means not having elastic properties.

As used herein, the terms "protective layer", "protective film layer", and "functional layer" mean a layer that restricts the passage of materials including, but not limited to, liquids, gases, and particulates that are designed to be restricted. This layer is considered liquid-proof if it prevents liquid water penetration against a pressure of at least 0.07 bar for a duration of at least 3 minutes. The protective layer material preferably guarantees a water penetration pressure of more than 0.07 bar. The water penetration pressure is measured on a liquid-proof panel based on the same conditions described with respect to the "Suter Test for Liquid-proof Seams" described herein.

As used herein, the term "seam" means the area where two or more layers and/or laminates are joined together by sewing, gluing or other mechanical joining.

As used herein, a "liquid-proof seam" is a seam that will not leak or weep liquid when challenged with a test fluid at a pressure of at least 0.07 bar for a duration of at least 3 minutes based on the "Suter Test for Liquid-proof Seams," wherein the test is conducted with an appropriate liquid. The appropriate liquid is defined as water or other suitable liquid and may be dependent upon the intended use of the garment.

As used herein, the term "durably liquid-proof seam" means a seam that will not leak or weep liquid when challenged with a test liquid at a pressure of at least 0.07 bar for a duration of 3 minutes after 5 machine wash and dry cycles based on the "Test for Durably Liquid-proof Seams" described herein. The appropriate test liquid is defined as water or other suitable liquid and may depend upon the intended use of the garment and may consist of water or a suitable liquid.

The term "substantially flattened" is meant to denote that the corrugations are flattened or nearly flattened. Similarly then, "substantially flat" is meant to denote that the corrugations are flat or nearly flat.

DETAILED DESCRIPTION OF THE INVENTION

Unless defined otherwise, all technical and scientific terms used herein have the same meaning as commonly understood by one of ordinary skill in the art to which the invention belongs. In the drawings, the thickness of the lines, layers, and regions may be exaggerated for clarity. It will be understood that when an element such as a layer is referred to as being "on" another element, it can be directly on the other element or intervening elements may also be present. Also, when an element is referred to as being "adjacent" to another element, the element may be directly adjacent to the other element or intervening elements may be present. The terms "top", "bottom", "side", and the like are used herein for the purpose of explanation only. Like numbers found throughout the figures denote like elements. The terms "laminate panels" and "elastic laminated panels" may be used interchangeably herein.

The present invention is directed to a liquid-proof seamed article and an apparatus and method for making the same. In one exemplary embodiment, a liquid-proof seam is formed between two or more elastic laminate panels along corresponding sealing regions. At least one of the elastic laminate panels is corrugated. In exemplary embodiments, both elastic laminate panels are corrugated. The present invention provides for an optional pre-treatment step and a means for removing the corrugations of an elastic laminate panel in order to provide a liquid-proof seam. The laminate panels have at least one protective layer and at least one textile layer, and at least one of the protective layer or textile layer is elastic. The seamed laminates are suitable for use in the fabrication of flexible liquid-proof apparel. The improved seam construction provided by way of the invention does not suffer from the leakage limitations of conventional seam constructions. Thus, the invention provides the capability for producing a new class of liquid-proof, protective, and elastic apparel.

FIGS. 1-6 depict embodiments of roller surface configurations suitable for use in the apparatus of the invention in which the seam sealing apparatus includes a first roller having at least one convex surface and a second roller having at least one mating concave surface. It is to be noted that although one or both of the elastic laminate panels are corrugated, the description set forth herein is directed to embodiments where both elastic laminate panels are corrugated. As illustrated in FIG. 1, the seam sealing apparatus 300 includes a first or lower drive unit 301 having a solid roller with two concave surfaces 302 and a second or upper drive unit 303 having a solid roller with two mating convex surfaces 304. As used herein, a solid roller is meant to denote a roller that has at least one concave or convex surface on a single roller and the roller is not divided or otherwise "split" into two or more portions. The lower drive unit 301 is attached to the seam sealing apparatus 300 in such fashion that the roller having concave surfaces 302 of the lower drive unit 301 is both in contact and mated with the roller having convex surfaces 304 of the upper drive unit 303 to form a nip 310 therebetween. In use, the seamed corrugated laminate is passed through the nip where an adhesive is sequentially applied and bonded to the seamed laminate while the rollers having at least one convex surface and at least one mating concave surface substantially expand or flatten the corrugations along the edges of the seam.

Because of the elastic nature of the laminate, the seamed laminate conforms to the mating concave/convex surfaces of the rollers both entering and exiting the seam sealing apparatus. This elasticity causes the laminate to essentially "wrap" around the surfaces of the rollers, thus allowing the corrugations to substantially flatten at the nip of the seam sealing apparatus and provide the seamed laminate with a liquid-proof seam, and in exemplary embodiments, a durably liquid-proof seam.

The design of the roller surfaces 302 and 304 allows for the adhesive to cover the substantially flattened surface of the laminate without gaps in the adhesive. As used herein, the phrase "substantially without gaps" is meant to denote having no gaps in the adhesive or nearly no gaps in the adhesive. It is to be appreciated that the presence of gaps may adversely affect the liquid-proof property of the laminate by allowing leaks in the seam where the adhesive gaps are present.

Figure 2:
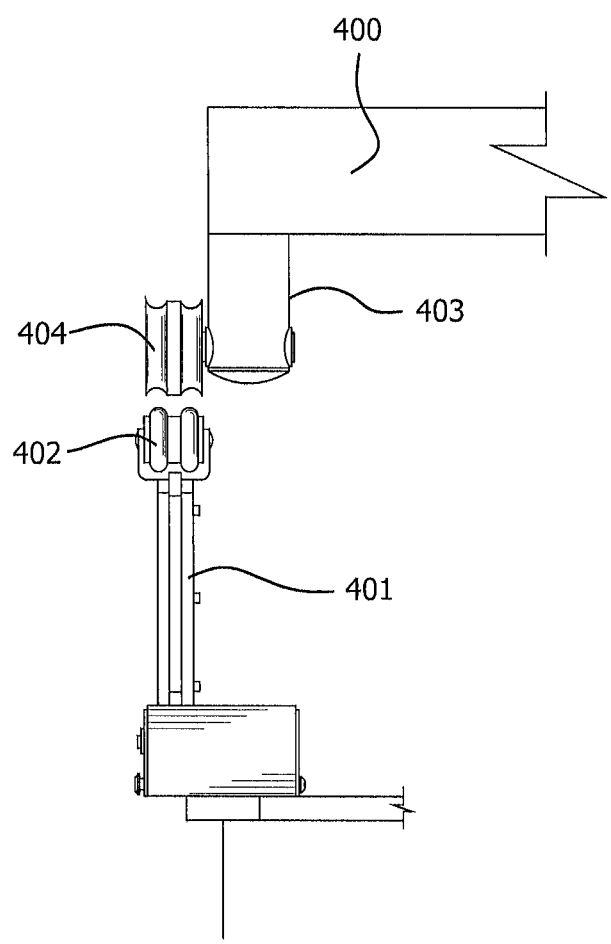
FIG. 2 is a schematic illustration of a seam sealing apparatus having a lower drive unit with a solid convex roller and an upper drive unit with a solid concave roller according to another exemplary embodiment of the invention.

It is also to be appreciated that the convex and concave surfaced roller(s) are interchangeable between the lower and upper drive units. Turning now to FIG. 2, an exemplary embodiment of seam sealing apparatus 400 with a lower drive unit 401 having a solid convex roller 402 and an upper drive unit 403 having a solid mating concave roller 404 can be seen.

Figure 3:
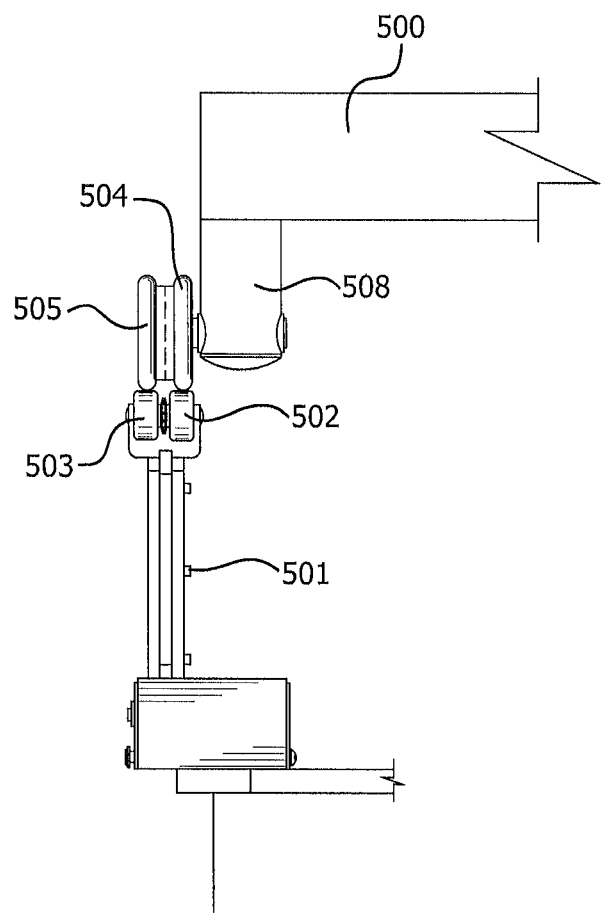
FIG. 3 is a schematic illustration of a seam sealing apparatus having a lower drive unit with a split concave roller and an upper drive unit with a split convex roller according to yet another embodiment of the invention.

Yet another suitable embodiment provides for two convex or concave surfaces on separate rollers or a split roller. As shown in FIG. 3, seam sealing apparatus 500 has a lower drive unit 501 with a split right concave roller 502 and a split left concave roller 503 and an upper drive unit 508 with a split right convex roller 504 and a split left convex roller 505. Alternatively, separate rollers having mating concave and convex surfaces may be substituted for the split concave rollers 502 and 503 and the split convex roller 504 and 505, respectively.

Figure 4:
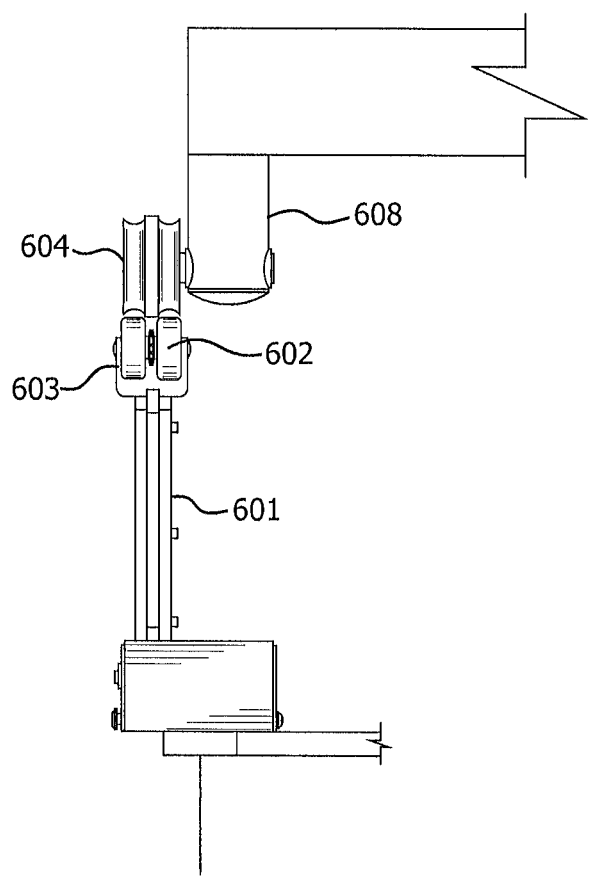
FIG. 4 is a schematic illustration of a lower drive unit with a split convex roller and an upper drive unit with a solid concave roller according to at least one embodiment of the invention.

Another embodiment includes a roller with solid concave or convex surfaces mating with a split roller having mating convex or concave surfaces, as illustrated in FIG. 4. As depicted in FIG. 4, seam sealing apparatus 600 has a lower drive unit 601 with a right split convex roller 602 and a left split concave roller 603 and an upper drive unit 608 with a solid concave roller 604.

Figure 5:
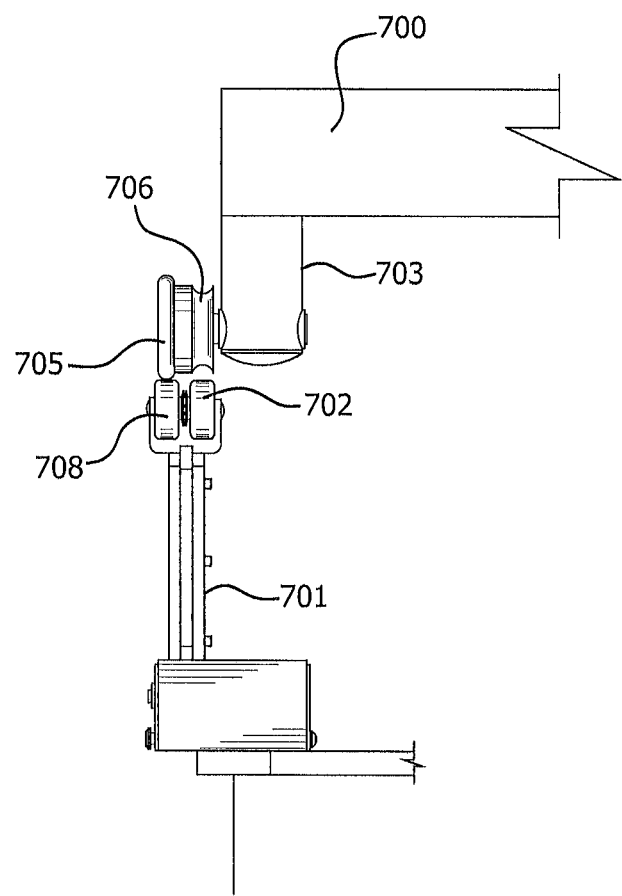
FIG. 5 is a schematic illustration of a seam sealing apparatus having a lower drive unit with a split right convex and left concave roller and an upper drive unit with a solid left convex and right concave roller according to at least one exemplary embodiment of the invention.
Figure 6:
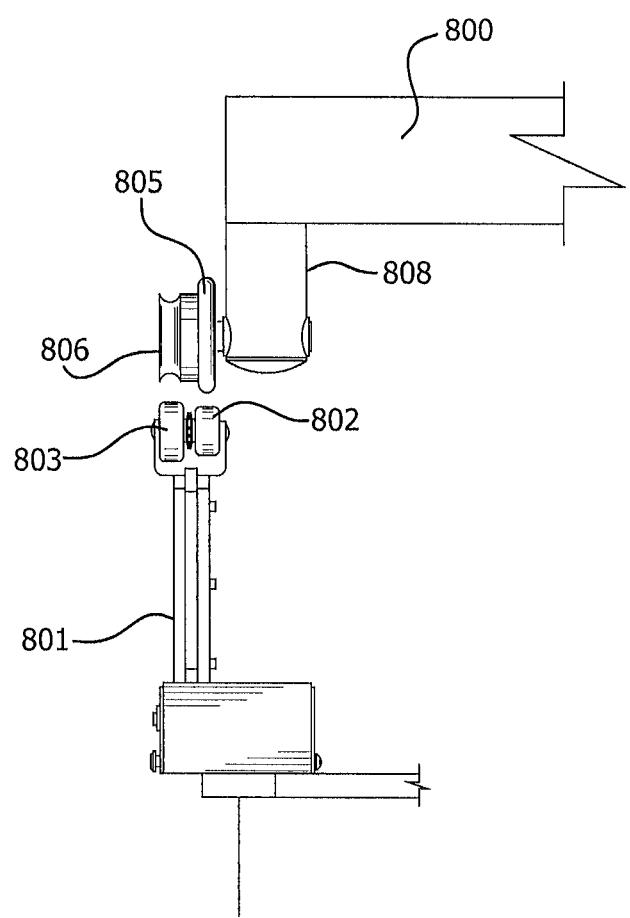
FIG. 6 is a schematic illustration of a seam sealing apparatus having a lower drive unit with a split right concave and left split convex roller and an upper drive unit with a split left concave and split right convex roller according to a further embodiment of the invention.

Yet other suitable embodiments include apparatuses where the first drive unit has at least one convex surface and at least one concave surface on a solid, separate, or split roller and the second drive unit has at least one mating concave surface and at least one mating convex surface on a solid, separate, or split roller, as shown in FIGS. 5 and 6. More specifically, FIG. 5 shows a seam sealing apparatus 700 having a lower drive unit 701 with a split right convex 702 and left concave 708 roller and an upper drive unit 703 with a solid left convex 705 and right concave 706 roller.

FIG. 6 depicts a seam sealing apparatus 800 having a lower drive unit 801 with a split right concave 802 and left convex 803 roller and an upper drive unit 808 with a split right convex 805 roller and left concave 806 roller.

Figure 7:
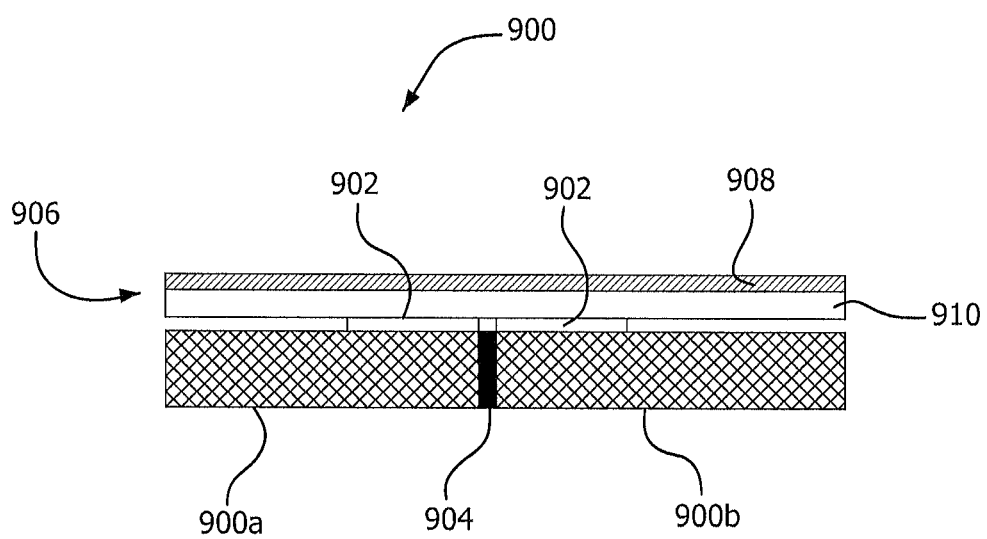
FIG. 7 is a schematic illustration of an adhesive pre-treated seam-sealed laminate according to exemplary embodiments of the invention.

A seam-sealed corrugated laminate panel according to one embodiment of the invention is shown in cross-section in FIG. 7. As depicted in FIG. 7, two laminate panels 900a and 900b are joined together by seam 904. The seam 904 forms seamed laminate 900 with an adhesive layer 902. Seam tape 906 having an upper layer 908 of a protective layer (e.g., ePTFE) and a lower layer 910 of adhesive is adhered to adhesive layer 902 of the seamed laminate 900. With this construction, when seam 904 is sealed by bonding the adhesive layer 910 of seam tape 906 with adhesive layer 902 of the seamed laminate 900, a liquid-proof seam 904 is formed.

An additional aspect of the invention is that an adhesive pre-treatment may be applied to a corrugated laminate along a sealing region (i.e., an edge to be seamed). Furthermore, the laminate can be optionally stretched to substantially flatten the corrugations prior to forming a seam. In one embodiment, the adhesive pre-treatment may be carried out by any conventionally known technique for applying an adhesive. The adhesive pre-treatment may be conducted when the corrugations of the two laminate panels to be seamed are running in the machine-direction.

Alternatively, when the corrugations of at least one of the laminate panels to be seamed are running in the transverse and/or diagonal direction, the adhesive pre-treatment can be carried out while stretching the laminate to substantially flatten the corrugations running transversely and/or diagonally so that the adhesive can substantially cover the edge of the laminate to be seamed without any substantial gaps in the adhesive layer. During the adhesive pre-treatment, the transverse or diagonal corrugations may be substantially flattened by way of back tension on the laminate supplied by an operator of the seam sealing apparatus while simultaneously running the laminate through a set of rollers have matching convex and concave surfaces during application of the adhesive to the laminate, such as those depicted in FIGS. 1-6. By substantially flattening the corrugations in the manner described above, voids in the applied adhesive are essentially eliminated and a durably liquid-proof seam is thus provided.

With respect to making the corrugated laminates of the invention, lamination of one or more protective layers and one or more textile layers may be carried out by any suitable conventional lamination techniques. One method for making a stretchable protective laminate which can be seam-sealed by way of the invention includes applying an adhesive onto a surface of a selectively permeable inelastic chemical (or chemical and biological) protective layer, stretching an elastic textile layer, and joining the selectively permeable inelastic chemical (or chemical and biological) protective layer and the stretched elastic textile layer with the applied adhesive. The adhesive is then sufficiently cured to bond the selectively permeable inelastic chemical protective layer to the stretched elastic textile layer. The load used to stretch the elastic textile is removed and the stretched elastic textile is relaxed, thereby forming a stretchable chemical protective material having a corrugated selectively permeable chemical protective layer.

Alternative examples of corrugated laminates suitable for use in the invention include laminates formed by applying an adhesive onto a surface of an inelastic textile layer, stretching an elastic chemical protective layer, and then joining the inelastic textile layer and the stretched elastic chemical protective layer with an applied adhesive. The adhesive is sufficiently cured to bond the textile layer to the stretched elastic chemical protective layer. Next, the load used to stretch the elastic protective layer is removed, which relaxes the stretched protective layer and forms a stretchable chemical protective material having a corrugated textile layer.

Yet another suitable example of corrugated laminated layers includes both an elastic chemical (or chemical and biological) protective layer and an elastic textile. The elastic textile forms a stretchable chemical protective material having corrugated protective and textile layers. In this example, both the protective layer and the textile layer can be elongated and laminated as described above. After lamination, the laminate is allowed to relax from its elongated state, thus forming corrugations in both the protective and textile layers.

Other suitable constructions of laminates for use in making clothing apparel include the incorporation of non-corrugated laminates where both the protective and textile layers are inelastic. Non-corrugated laminates may then be incorporated along with corrugated laminates provided by way of the invention in the manufacture of apparel as may be desired to provide the apparel with areas having elasticity or inelasticity as determined by the requirements of the particular garment.

Protective Layer

The protective layer is a layer that restricts the passage of materials including, but not limited to, liquids, gases, and/or particulates that are designed to be restricted. The protective layer of the corrugated laminate may be a protective film, coating, membrane, or combination thereof. In addition, the protective layer may be formed of more than one layer. The additional layers are selected to provide desired properties, such as, for example, permeability and/or durability. The composition of the protective layer includes, but is not limited to, polyesters, polyamides, polyketones, polysulphones, polycarbonates, fluoropolymers (e.g. polytetrafluoroethylene and expanded polytetrafluoroethylene), polyacrylates, co-polyether esters, co-polyether amides, polyurethanes, polyvinylchlorides, polytetrafluoroethylene coated with a polyolfin, low-density polyethylene, and combinations thereof. In exemplary embodiments, the protective layer is formed from expanded polytetrafluoroethylene (ePTFE), which is known to be both waterproof and highly breathable. The ePTFE may be provided with a coating of a hydrophilic polymer in a known manner.

Porous or non-porous support layers may be provided to one or both sides of the selectively permeable chemical protective layer. In one embodiment, the selectively permeable chemical protective film includes a multilayer composite formed of two porous support layers on either side of a selectively permeable polymer layer. A portion of the selectively permeable polymer may reside within the pores of the porous support layers.

Inelastic Chemical Protective Film

The stretchable chemical protective material may be formed from an inelastic selectively permeable chemical protective film. The inelastic film has a stiffness greater than or equal to about 20 g, greater than or equal to about 30 g, greater than or equal to about 50 g, or greater than or equal to about 70 g (or more) when tested according to the "Stiffness Test" method described in U.S. Patent Publication No. 2011/0167547. Selectively permeable inelastic chemical protective films for use in the stretchable materials may have an elongation of less than about 10% at 4 lbf desirably less than about 5% at 4 lbf, when tested according to the "Elongation and Recovery Test" method described in U.S. Patent Publication No. 2011/0167547, prior to being incorporated into the stretchable materials.

Elastic Chemical Protective Film

The stretchable chemical protective material may be formed from an elastic selectively permeable chemical protective film having an elongation greater than about 100% at 4 lbf., desirably greater than about 200% at 4 lbf., for five seconds with a recovery of at least about 95%.

Textile Layer

A wide range of textiles may be used in the corrugated laminates. When the textile layer of the corrugated laminate is an elastic material, elastic textiles such as elastic knits and elastic woven or non-woven fabrics may be used. Elastic textiles may include, but are not limited to, synthetic or natural fibers such as nylon, polyester, polypropylene, polyurethane, spandex, cotton fibers and the like, as well as combinations thereof. Non-limiting examples of polyesters that can be used include polyethylene terephthalate, polytrimethylene terephthalate, and polytetrabutylene terephthalate.

Alternatively, or in addition to, the textile layer may include an inelastic material. The inelastic textile fiber member may, for example, be made from non-conducting inelastic synthetic polymer fiber(s) or from natural textile fibers like cotton, wool, silk, and linen. The synthetic polymer fibers may be continuous filament or staple yarns selected from multifilament flat yarns, partially oriented yarns, or textured yarns. They can further include bicomponent yarns, such as those selected from nylon, polyester, or filament yarn blends.

Suitable layers of textiles include textiles having a complex textile geometry. As defined herein, textiles with a "complex textile structure" have a fiber or filament structure (whether mono-filament or multi-filament) that form a tortuous path through which liquid adhesives have a limited ability to penetrate to the protective film layer and to encapsulate the filaments of the textile layer to form a liquid-proof seam. Complex textile structures can include, for example, wovens, nonwovens, knits, and brushed, fleeced, or otherwise napped (i.e., any suitable raised surface) materials.

Additional textile layers, whether complex or otherwise, are also suitable for use in the laminates contemplated in the present invention, limited solely by the requirements of the finished apparel.

The production of liquid-proof and breathable corrugated soft shell garments having flexible and durably liquid-proof seams is highly desirable and does not exist currently in the apparel industry. A "soft shell" is defined herein as a laminate with one or more complex textiles, such as a laminate with a woven durable outer textile and a soft, fleece-like or other complex textile lining which provides a sensation of comfort to the wearer. To date, commercially available liquid-proof, breathable three-layer laminates and garments have been restricted to brushed knit liner layers of limited complexity and limited thickness to permit adequate liquid-proof sealing of the seams.

However, by substantially flattening the corrugations of the laminates along seam-sealing regions by way of the invention, these garments can be provided with liquid-proof, or durably liquid-proof, sealed seams.

In addition, reversible protective garments incorporating three-layer (or more) laminate structures that include complex textiles on both sides would be highly desirable, particularly if the garments could be made with durably liquid-proof seams. Current reversible garment constructions made with such textiles are only water-resistant and are not available in a truly liquid-proof form as there have been no means until now to create a durably liquid-proof seam with durable, complex textile structures on both sides of a protective laminate. Sealing through the textile structure is even more difficult when both sides are treated with water and stain repellent treatments, such as SCOTCHGARD® coatings from 3M or TEFLON® textile treatments from DuPont, as would be typical in these applications.

These corrugated textile structures can now be seam-sealed by way of the invention and thus provided with liquid-proof, especially durably liquid-proof, seams as described and shown in FIGS. 1-7 above.

The corrugated laminated materials of the invention can be used as a material for a variety of garments and other textile products. Conventional methods that incorporate a cutting and stitching step can be used to manufacture garments using the corrugated laminates of the invention; however, some or all of the stitched regions of the garments are preferably treated with seam tape when the garment is used for rain or cold weather gear that must be waterproof and windproof. It has been surprisingly discovered that expanding or substantially flattening the corrugations of an elastic laminate at the edges to be seamed while applying an adhesive allows for the adhesive to substantially cover the surface of the laminate along the edges to be seamed without any or without substantially any gaps in the adhesive, which advantageously results in a liquid-proof seam, especially a durably liquid-proof seam.

Testing Methods

It should be understood that although certain methods and equipment are described below, any method or equipment determined suitable by one of ordinary skill in the art may be utilized.

Suter Test for Liquid-Proof Seams

To determine whether a protective film fabric or the seams of a garment made from the protective film fabric are waterproof, the Suter test procedure is used, which is based generally on the description in ISO 811-1981. This procedure provides a low pressure challenge to the sample being tested by forcing water against one side of the test sample and observing the other side for indication that water has penetrated through the sample.

The sealed seam test sample is clamped and sealed between rubber gaskets in a fixture that holds the sample so that water can be applied to an area of the sample 3 inches in diameter (7.62 cm). The water is applied under air pressure of 1 psig (0.07 bar) to one side of the sample. In testing a fabric laminate, the water would be applied to the face or exterior side. In testing a sealed seam, water is applied to the face side of the sample and the opposite side, or seam backer layer, is observed for leaks.

The opposite side of the sample is observed visually for any sign of water appearing (either by wicking or the appearance of droplets) at the seam edge for 3 minutes. If no water is observed, the sample has passed the test and the sample is considered liquid-proof.

Test for Durably Liquid-proof Seams

To determine the durability of a liquid-proof seam, the seam sample is washed and dried generally following the conditions outlined in ISO 6330:1984 Procedure No. 3B. Specifically, the sample is loaded in a 4 pound (about 2 Kg) load of laundry into a top loading washing machine set to a medium water level (18 gallons, or equivalently 0.0681 m$^3$), hot water temperature (140° F., or equivalently, 60° C.), warm rinse cycle and heavy duty wash cycle set for 10 minutes, with 90 g of TIDE® powdered laundry detergent. The load is then dried in a rotating dryer on the "Hot" setting for a 35-45 minute drying time. This wash/dry regimen is repeated five times.

The seam sample is then subjected to the Suter Test for Liquid-proof Seams, described above. If no water is observed upon testing, the sample has passed the test and the sample is considered durably liquid-proof.

Having generally described this invention, a further understanding can be obtained by reference to certain specific examples illustrated below which are provided for purposes of illustration only and are not intended to be all inclusive or limiting unless otherwise specified.

EXAMPLES

Example 1

Figure 8A:
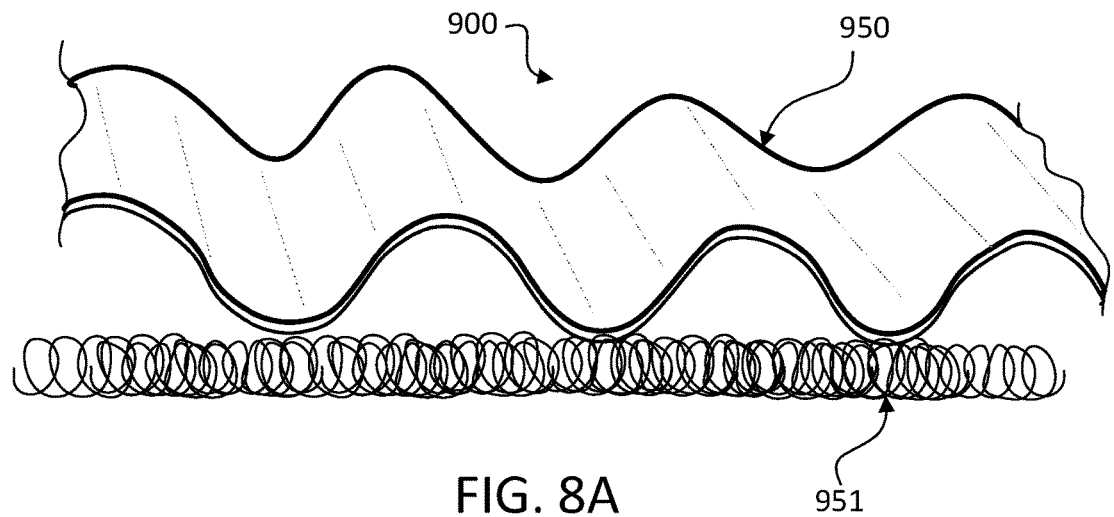
FIGS. 8A and 8B are schematic illustrations of a corrugated elastic laminate panel according to exemplary embodiments of the invention.
Figure 8B:
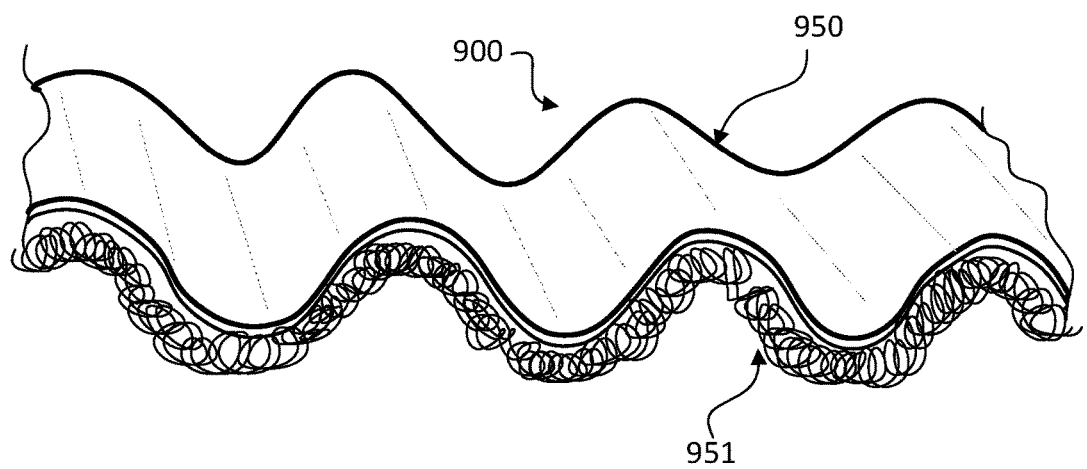

A corrugated ePTFE laminate as described in U.S. Patent Publication 2011/0167547 to Jain was used. FIG. 8A show an elastic laminate panel 900 having a protective layer 950 and textile layer 951, wherein only the protective layer 950 is corrugated, that is, the textile layer 951 is flat or does not show any significant corrugated structure. FIG. 8B shows protective layer 950 and textile layer 951, wherein both the protective layer 950 and the textile layer 951 are corrugated. As illustrated in FIG. 8B, peaks of the protective layer 950 are aligned with peaks of the of the textile layer 951 and valleys of the protective layer 950 are aligned with valleys of the textile layer 951. The laminate had the following properties:

The face fabric was a 2-way stretch, multi-filament Raschel knit made of nylon (W.L. Gore & Associates, Inc., Newark, Del. #EBNJ403AZ). The laminate thickness was about 0.91 mm (0.036 inch) at the top of the corrugations and about 0.24 mm (0.0095 inch) at the bottom of the corrugations. The laminate passed the Suter Test. The corrugations were substantially uniform, running parallel to the width of the laminate and were approximately 0.47 mm (0.0185 inch) wide.

An adhesive pre-treatment on the seam sealing region (edge) of the laminate was carried out as follows. The laminate was tensioned to remove the corrugations and a hot melt PU adhesive, 0.20 mm thick, 13 mm wide (W.L. Gore & Associates, Inc., Newark, Del. #6RPAL013PWHUS) was heated and applied along the edge of the corrugated (i.e., the ePTFE layer) side of the laminate, using a hot air seam sealing machine with conventional rollers (Gore-Seam® Tape Sealing Machine Series 6100 from W.L. Gore & Associates, Inc., Newark, Del.). The adhesive was cured at ambient temperature.

Two panels of adhesive-covered laminates were then laid up so that the knit side of each contacted each other and the corrugations were parallel to one another. The edges of the two adhesive-covered panels were then sewn together using TEX40 polyester cotton core thread (American & EFIRD, Inc., Mt. Holly, N.C. 28120) with 3.5 stitches per cm (9 stitches per inch).

A drive system utilizing lower and upper units with a matched set of concave and convex roller surfaces (available from W.L. Gore & Associates, Elkton, Md., ID#s 1005092 and 1005101) that mate as shown in FIG. 1 was utilized for seam sealing the sewn laminate. The lower drive unit 301 was attached to the seam sealing machine 300 such that the concave rollers 302 of the lower drive unit 301 contacted the mating convex rollers 304 of the upper drive unit 303 as shown in FIG. 1. The concave roller mated with the convex surface of the upper roller. An ePTFE-based seam tape (W.L.

Gore & Associates, Inc., Elkton, Md. #6C5AJ025NATX5) having a polyurethane (PU) coating that was 0.15 mm thick and 25 mm wide was utilized for sealing the seam.

The sewn laminate was fed into the nip between the top and bottom rollers and the rollers were activated, thereby actuating the nozzle which provided hot air to melt the PU adhesive of the seam tape. The sewn laminate and seam tape were run through the same hot air sealing machine as described above in order to bond the adhesive side of the seam tape to the adhesive side of the sewn laminate. A fully sealed sewn seam resulted.

The design of the mating concave/convex rollers ensured virtually the full removal (i.e., flattening) of the corrugations along the sealing region of the laminate, thus allowing the PU adhesive of the seam tape to cover the flattened surface of the ePTFE layer of the laminate.

The seam was tested in accordance with the Suter test described above. The results of the test indicated no leakage after 3 minutes. The seamed sample was subjected to the wash durability test described above and then subjected once again to the Suter test. The results of the test indicated no leakage after 3 minutes.

Comparative Example A

A seamed sample was constructed in the same manner, with the same materials as described in Example 1 with the following exceptions. The edge pre-treatment was not performed. Additionally, instead of using a matched set of concave and convex rollers, a matched set of conventional flat rollers was used (available from W.L. Gore & Associates, Elkton, Md., ID#s SSP4003A and SSP2003A).

The seam was tested in accordance with the Suter test described above. The results of the test indicated leakage before 3 minutes.

Example 2

A seamed sample was constructed in the same manner, with the same materials as described in Example 1 with the following exception. The corrugations of the two pieces of adhesive-covered laminate were laid up perpendicular to each other.

The seam was tested in accordance with the Suter test described above. The results of the test indicated no leakage after 3 minutes. The seamed sample was subjected to the wash durability test described above and then subjected to the Suter test, once again. The results of the test indicated no leakage after 3 minutes.

Comparative Example B

A seamed sample was constructed in the same manner, with the same materials as described in Example 2 with the following exceptions. The edge pre-treatment was not performed. In addition, instead of using a matched set of concave and convex rollers, a matched set of conventional flat rollers was used as in Comparative Example A.

The seam was tested in accordance with the Suter test described above. The results of the test indicated leakage before 3 minutes.

Example 3

A seamed sample was constructed in the same manner, with the same materials as described in Example 1 with the following exception. The corrugations of the two pieces of adhesive-covered laminate were laid up at 45 degrees relative to each other.

The seam was tested in accordance with the Suter test described above. The results of the test indicated no leakage after 3 minutes. The seamed sample was subjected to the wash durability test described above and then subjected to the Suter test, once again. The results of the test indicated no leakage after 3 minutes.

Comparative Example C

A seamed sample was constructed in the same manner, with the same materials as described in Example 3 with the following exceptions. The edge pre-treatment was not performed. Also, instead of using a matched set of concave and convex rollers, a matched set of conventional flat rollers was used, as used in Comparative Example A.

The seam was tested in accordance with the Suter test described above. The results of the test indicated leakage before 3 minutes.

The Examples set forth herein demonstrate that durably liquid-proof seams for corrugated laminates suitable for use in the manufacture of protective garments can be provided by way of the invention.

The invention of this application has been described above both generically and with regard to specific embodiments. The invention is not otherwise limited, except for the recitation of the claims set forth below.

What is claimed is:

1. A seamed article comprising:
   (1) at least two elastic laminate panels, each of said at least two elastic laminate panels including
      (a) at least one protective layer;
      (b) at least one textile layer; and
      (c) a sealing region on at least a portion of each of said at least two elastic laminate panels,
      wherein at least one of said at least two elastic laminate panels is a corrugated elastic laminate panel,
      wherein the at least one protective layer of the at least one corrugated elastic laminate panel comprises first corrugations, and
      wherein the at least one textile layer of the at least one corrugated elastic laminate panel comprises second corrugations,
      wherein the at least one protective layer is affixed to the at least one textile layer such that peaks of the first corrugations align with peaks of the second corrugations and valleys of the first corrugations align with valleys of the second corrugations; and
   (2) at least one liquid-proof seam joining together the respective sealing regions of said at least two elastic laminate panels.

2. The seamed article of claim 1, wherein at least one of said at least one protective layer and said at least one textile layer is elastic.

3. The seamed article of claim 1, wherein the at least one seam is a durably liquid-proof seam.

4. The seamed article of claim 1, wherein the at least one protective layer is inelastic.

5. The seamed article of claim 1, wherein the at least one textile layer is inelastic.

6. The seamed article of claim 1, wherein the at least one protective layer and the at least one textile layer are elastic.

7. The seamed article of claim 1, wherein said protective layer is a material selected from the group consisting of a polyester, a polyamide, a polyketone, a polysulfone, a polycarbonate, a fluoropolymer, a polyacrylate, a co-polyether ester, a co-polyether amide, a polyurethane, a polyvinylchloride, a polytetrafluoroethylene coated with a polymer and combinations thereof.

8. The seamed article of claim 7, wherein the fluoropolymer is expanded polytetrafluoroethylene (ePTFE).

9. The seamed article of claim 1, wherein said at least one textile layer has a construction selected from the group consisting of wovens, nonwovens and knits.

10. The seamed article of claim 9, wherein said at least one textile layer further comprises at least one layer of a brushed, fleeced or napped material.

* * * * *